June 17, 1930.     O. E. REIMER     1,765,176
DISK HARROW SEEDER ATTACHMENT
Filed Feb. 27, 1929     2 Sheets-Sheet 2
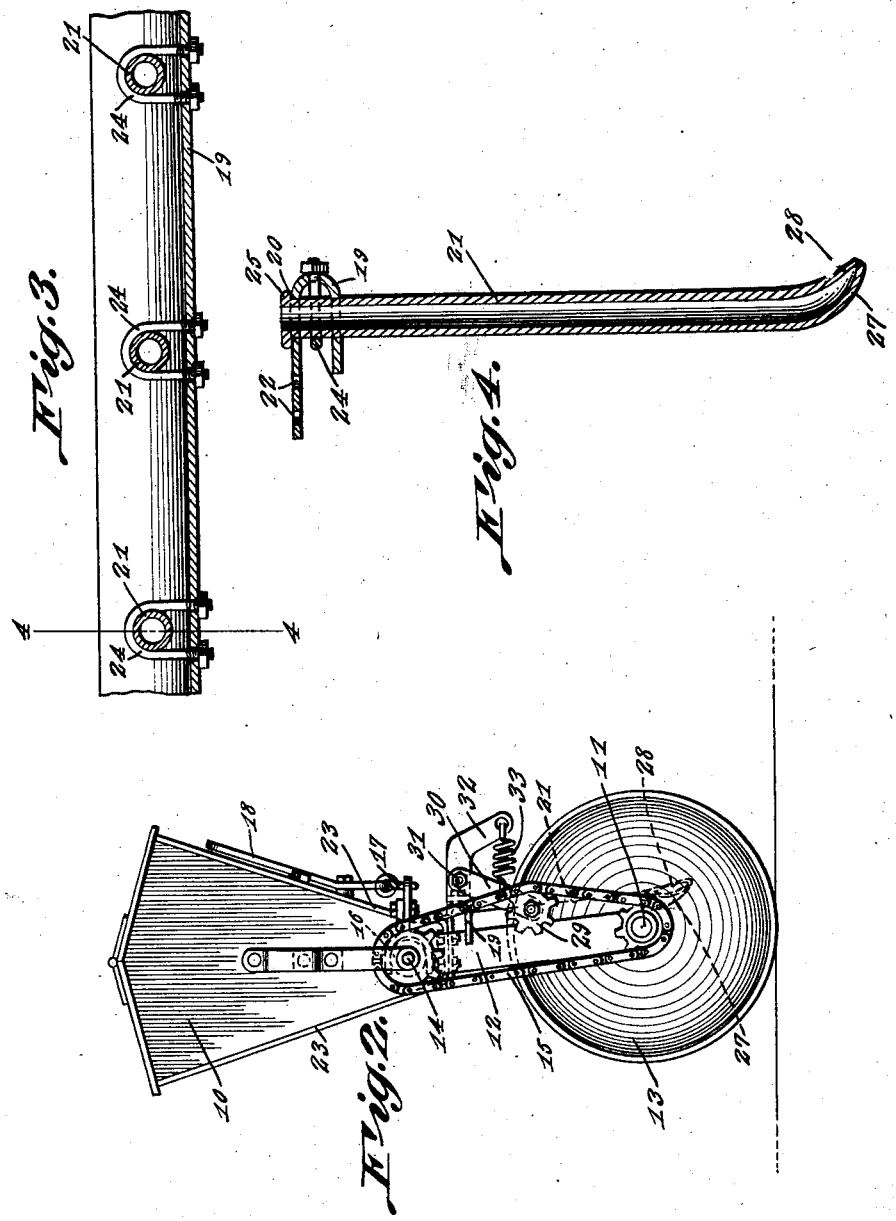

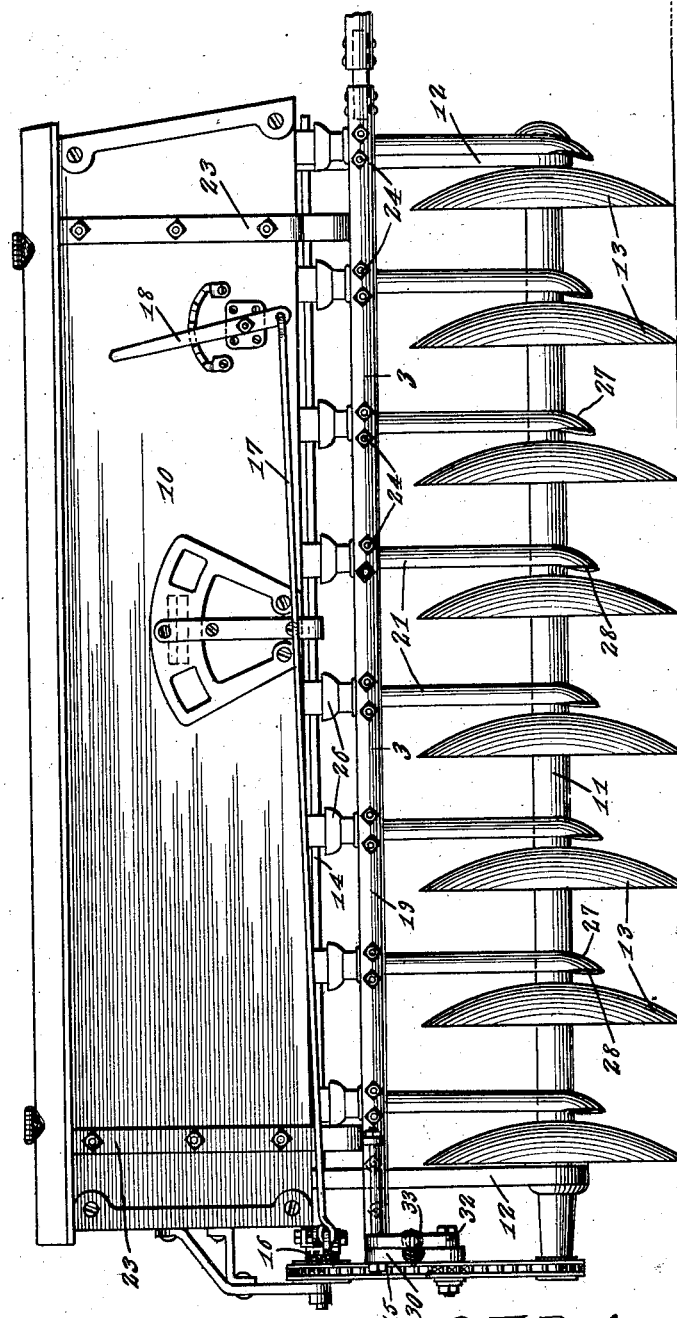

Patented June 17, 1930

1,765,176

UNITED STATES PATENT OFFICE

OTTO E. REIMER, OF ELM SPRINGS, SOUTH DAKOTA

DISK-HARROW SEEDER ATTACHMENT

Application filed February 27, 1929. Serial No. 343,053.

This invention relates to a combined seeder and harrow, an object being to provide a combination machine which will reduce the amount of machinery necessary for planting as well as for harrowing. In addition, the invention will also reduce the amount of power required for operating an extra machine.

Another object of the invention is the provision of a machine of the above character in which the grain discharge boots may be adjusted with respect to the harrow disks, together with a novel construction of boot which reduces liability of clogging the discharge ends of the boots.

With the above and other objects in view, the invention further includes the following novel features and details of construction, to be hereinafter more fully described, illustrated in the accompanying drawings and pointed out in the appended claims.

In the drawings:—

Figure 1 is an elevation of one section of a combination harrow and seeder.

Figure 2 is an end view.

Figure 3 is an enlarged fragmentary sectional view taken substantially on the line 3—3 of Figure 1.

Figure 4 is a section on the line 4—4 of Figure 3.

Referring to the drawings in detail wherein like characters of reference denote corresponding parts, the invention as shown may be made of separate sections mounted upon a suitable frame so that one or more sections may be used as desired.

Each section comprises a seed hopper 10 which is connected with an axle 11 by means of bearing members 12, and mounted upon this axle are disks 13.

The hopper is provided with suitable dropping mechanism which includes a shaft 14 and this shaft is driven by means of a sprocket chain 15 and its operation is controlled by a clutch 16. A rod 17 and an operating lever 18 serve to provide means for moving the clutch into and out of engagement.

The seeder mechanism further includes a bar 19 which is disposed horizontally beneath the hopper 10. This bar is substantially U shaped in cross section as shown in Figure 4 of the drawings and is provided with spaced openings 20 which receive grain discharge boots 21. The bar 19 is provided with spaced openings 22 for the passage of bolts so that it may be bolted to the lower ends of spaced substantially V-shaped straps 23 which are secured to opposite sides of the hopper 10.

The grain discharge boots 21 are located adjacent the disks 19 and are adjustable with respect to these disks. For this purpose, the bar 19 carries U bolts 24 which engage the boots 21 so as to hold them in vertically and rotatably adjustable position. Downward movement of the boots is limited by a flange 25 which surrounds the upper ends of these boots. The boots 21 receive the grain from the hopper through discharge spouts 26.

The lower ends of the boots 21 are curved as shown at 27 and extending upward from the lower curved extremities of the boots and opposed to the disks 13 are discharge openings 28 through which the grain passes. The arrangement and position of the openings 28 prevent these openings from becoming clogged due to an accumulation of dirt or other substance thrown up by the disks.

The chain 15 is maintained in proper operative condition through the medium of a chain tightener. This tightener comprises a sprocket 29 which engages the chain and which is carried at one end of an arm 30. The opposite end of this arm is pivotally mounted as shown at 31 to an arm 32 and these arms are connected by means of a spring 33 which yieldingly holds the sprocket 29 engaged with the chain.

The invention is susceptible of various changes in its form, proportions and minor details of construction and the right is herein reserved to make such changes as properly fall within the scope of the appended claims.

Having described the invention what is claimed is:

1. In a seeder attachment for disk harrows, a seed hopper, a substantially U-shaped bar having spaced openings therein, grain delivering boots adjustably positioned within said openings, means to secure the bar to the hopper, and spouts to direct the grain from the hopper into the boots.

2. In a seeder attachment for disk harrows, a seed hopper, a substantially U-shaped bar having spaced openings therein, grain delivering boots adjustably positioned within said openings, means to secure the bar to the hopper, spouts to direct the grain from the hopper into the boots, said boots having their lower ends curved and having openings extending upward from their lower extremities with the openings opposed to the disks.

In testimony whereof I affix my signature.

OTTO E. REIMER.